United States Patent
Ruetschi

[15] 3,657,018
[45] Apr. 18, 1972

[54] ALKALINE GALVANIC CELL HAVING A COVER MADE OF AN ELASTICALLY RESILIENT LAMINATE

[72] Inventor: Paul Ruetschi, Yverdon, Switzerland

[73] Assignee: Leclanche S.A., Yverdon, Vaud, Switzerland

[22] Filed: Apr. 21, 1970

[21] Appl. No.: 30,411

[30] Foreign Application Priority Data

May 2, 1969 Switzerland ..........................6756/69
May 9, 1969 Switzerland ..........................6756/69

[52] U.S. Cl............................................136/111, 136/169
[51] Int. Cl. .....................................................H01m 21/00
[58] Field of Search..................136/111, 107, 166, 133, 169

[56] References Cited

UNITED STATES PATENTS

| | | |
|---|---|---|
| 2,712,565 | 7/1955 | Williams, Jr. ..........................136/107 |
| 3,096,217 | 7/1963 | Clune ....................................136/107 |
| 2,985,703 | 5/1961 | Kempf et al. ..........................136/166 |
| 2,951,891 | 9/1960 | Kempf et al. ..........................136/169 |
| 3,418,172 | 12/1968 | Fletcher................................136/111 |
| 3,457,117 | 7/1969 | Angelovich............................136/133 |

*Primary Examiner*—Anthony Skapars
*Attorney*—Stevens, Davis, Miller & Mosher

[57] ABSTRACT

An alkaline galvanic cell having a positive electrode containing a heavy metal oxide in contact with a metallic housing and a negative electrode containing an amalgamated zinc in contact with a cover, said cover being formed from an elastically resilient laminate having an exterior side consisting of a layer of nickel or a layer of a rust-proof nickel alloy and having a thickness of 0.05 to 0.5 mm. and an interior side consisting of a layer of copper, zinc, tin, lead or their alloys and having a thickness of 0.05 to 0.5 mm. at least one layer of said laminate consisting of a spring alloy.

7 Claims, 1 Drawing Figure

PATENTED APR 18 1972 3,657,018
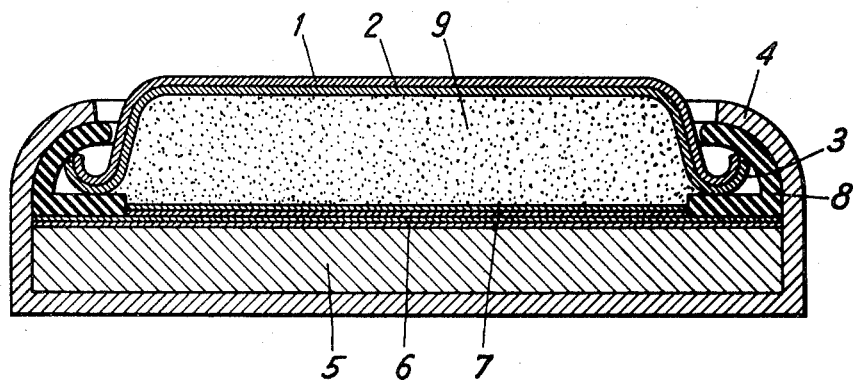

ALKALINE GALVANIC CELL HAVING A COVER MADE OF AN ELASTICALLY RESILIENT LAMINATE

The present invention relates to an alkaline galvanic cell having a positive electrode that contains a heavy metal oxide, and a negative electrode that contains amalgamated zinc. The galvanic cell, according to the present invention, is characterized in that the cover which is in contact with the zinc is in the form of an elastically resilient laminate which has an exterior side consisting of a layer of nickel or a layer of a rust-proof nickel alloy and having a thickness of 0.05 – 0.5 mm., and an interior side consisting of a layer of copper, zinc, tin, lead or their alloys and having a thickness of 0.05 – 0.5 mm., whereby at least one layer of said laminate consists of a spring alloy.

The interior side of the cover thus consists of a metal which, in its amalgamated condition, has a high hydrogen overvoltage.

The accompanying drawing shows, by way of example, one embodiment of the invention.

The cover is made of a laminate the upper part 1 of which consists of pure nickel or of a rust-proof nickel alloy, whereas the lower part 2 consists, for example, of a spring bronze that contains 5 – 15 percent tin, preferably 8 percent tin, the balance being copper, and has a hardness of more than 100 Vickers degrees of hardness. The interior layer may also consist of spring brass containing 30 – 40 percent zinc, preferably 37 percent zinc, and 60 – 70 percent copper, preferably 63 percent copper. It has a thickness of 0.05 – 0.5 mm., preferably about 0.1 – 0.2 mm. The thickness of the metallic layer 1 amounts to 0.05 – 0.5 mm, preferably 0.01 – 0.2 mm. The two layers need not be of the same thickness. The advantage of this composition of the cover is the fact that it provides exceedingly high tightness or imperviousness. The edge 3 of the resilient cover is preferably slightly bent in an upward direction. Upon closing the galvanic cell by bending in the edge of the metallic housing 4, the packing ring 8 is normally clamped between the cover and the housing. The cover in this case acts like a spring. The elastic deformation holds the packing ring under constant pressure so that, even after remaining stored for several years, and even if the packing material gives away a little due to cold-flowing, the spring-action of the cover makes it possible to maintain a steady undiminished pressure upon the packing material. For example, it has been found that a laminated cover having an exterior side of nickel and an interior side of a resilient spring bronze (92 percent copper, 8 percent tin) having a hardness of more than 100 Vickers degrees of hardness, or a resilient spring brass (63 percent copper, 37 percent zinc), provides a better spring action with respect to the packing ring, and thus insures greater imperviousness than a corresponding laminate having an interior side consisting of non-resilient pure copper, lead, zinc, tin and non-resilient alloys of such metals. The packing ring is made of nylon which is less subject to cold-flowing. The separators 6 and 7 are provided between the negative electrode of amalgamated zinc powder 9 and the positive electrode 5 which, for example, contains mercury oxide or silver oxide.

It is also possible to have the exterior layer of the laminate cover, instead of the interior layer, made in a resilient manner from nickel or rust-proof nickel alloys. However, in that case, based upon practical experience, this outer layer must have a hardness of more than 250 Vickers units when it consists of a nickel alloy. When the outer layer consists of pure nickel, it must have a hardness of more than 150 Vickers degrees of hardness, and the interior layer should then consist of spring bronze or spring brass.

Since the closing of the cell, by inwardly bending the edge of the housing 4, is to effect an elastic deformation of the laminate cover so that, upon removal of the tool used for bending the edge, the packing ring 8 is held under resilient pressure by said laminate cover, it is necessary that the metallic housing 4 be made to have an elasticity that is smaller than that of the laminate cover.

The galvanic cell according to the present invention is to remain impervious even after it is kept in storage over a period of years and at elevated temperatures. As mentioned above, the increased imperviousness is achieved by the spring action of the laminate cover.

The galvanic cell according to the present invention is capable of displaying a high capacity. This is more specifically set forth in the following example.

A button galvanic cell of 11.4 mm. diameter and 5.2 mm. height according to the drawing, contains in a housing 4 made of nickel-plated sheet steel 1.0 – 1.4 g. of a mixture consisting of 86 percent mercury oxide, 5 percent graphite and 9 percent manganese dioxide. Above this positive electrode 5 lies the separator 6. The packing ring 8 made of nylon encloses the edge 3 of the cover. The negative electrode 9 consists of 0.3 – 0.4 g. coarsely granular amalgamated zinc powder that contains 10 – 15 percent mercury. An element having the above-mentioned outer dimensions displays a capacity up to 240 mAh, whereas conventional galvanic cell having the same dimensions only go as high as 165 – 200 mAh.

What is claimed is:

1. An alkaline galvanic cell having a positive electrode that contains a heavy metal oxide in contact with a metallic housing, and a negative electrode that contains amalgamated zinc in contact with a cover, which is characterized in that the cover which is in contact with the zinc is in the form of an elastically resilient laminate which has an exterior side consisting of a layer of nickel or a layer of rust-proof nickel alloy and having a thickness of 0.05 – 0.55 mm., and an interior side consisting of a layer of copper, zinc, tin, lead or their alloys and having a thickness of 0.05 – 0.5 mm., whereby at least one layer of said laminate consists of a spring alloy.

2. An alkaline galvanic cell according to claim 1, which is characterized in that the exterior layer of the cover has a hardness of more than 250 Vickers degrees of hardness and is made elastically resilient.

3. An alkaline galvanic cell according to claim 1, which is characterized in that the exterior layer of the cover has a greater hardness than the metallic housing that is in contact with the positive electrode.

4. An alkaline galvanic cell according to claim 1, which is characterized in that the interior layer of the cover consists of a spring bronze containing 5 – 15 percent tin and 85 – 95 percent copper and in that said layer has a hardness of more than 100 Vickers degrees of hardness.

5. An alkaline galvanic cell according to claim 4 wherein said spring bronze contains 8 percent tin and 92 percent copper.

6. An alkaline galvanic cell according to claim 1, which is characterized in that the interior layer of the cover consists of spring brass containing 30 – 40 percent and 60 – 70 percent copper and in that said layer has a hardness of more than 100 Vickers degrees of hardness.

7. An alkaline galvanic cell according to claim 6 wherein said spring brass contains 37 percent zinc and 63 percent copper.

* * * * *